(12) United States Patent
Fischer et al.

(10) Patent No.: US 11,605,182 B2
(45) Date of Patent: Mar. 14, 2023

(54) METHOD FOR GENERATING REPRODUCIBLE PERSPECTIVES OF PHOTOGRAPHS OF AN OBJECT, AND MOBILE DEVICE WITH AN INTEGRATED CAMERA

(71) Applicant: AUDI AG, Ingolstadt (DE)

(72) Inventors: Andreas Fischer, Munich (DE); Deborah Salcher, Munich (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/777,153

(22) PCT Filed: Nov. 19, 2020

(86) PCT No.: PCT/EP2020/082611
§ 371 (c)(1),
(2) Date: May 16, 2022

(87) PCT Pub. No.: WO2021/148163
PCT Pub. Date: Jul. 29, 2021

(65) Prior Publication Data
US 2022/0398773 A1 Dec. 15, 2022

(30) Foreign Application Priority Data
Jan. 22, 2020 (DE) .................... 10 2020 101 398.1

(51) Int. Cl.
*G06T 7/73* (2017.01)
*G06V 20/20* (2022.01)
(Continued)

(52) U.S. Cl.
CPC ................ *G06T 7/74* (2017.01); *G06T 7/507* (2017.01); *G06T 17/00* (2013.01); *G06V 10/245* (2022.01);
(Continued)

(58) Field of Classification Search
CPC .. G06T 7/30; G06T 7/33; G06T 7/337; G06T 7/344; G06T 7/70; G06T 7/73;
(Continued)

(56) References Cited

U.S. PATENT DOCUMENTS

| 8,712,893 B1 | 4/2014 | Brandmaier et al. ........... 705/35 |
| 9,654,679 B1 | 5/2017 | Veliche .............. H04N 5/23203 |

(Continued)

FOREIGN PATENT DOCUMENTS

| DE | 10 2020 101 398.1 | 1/2020 | |
| EP | 2 608 531 A2 | 6/2013 | ............... H04N 5/33 |

(Continued)

OTHER PUBLICATIONS

International Search Report dated Feb. 11, 2021 for International Application No. PCT/EP2020/082611.
(Continued)

*Primary Examiner* — Andrew W Johns
(74) *Attorney, Agent, or Firm* — Staas & Halsey LLP (57) ABSTRACT

A first 2D recording of a specified reference view of an object is captured by a camera and, starting from the first 2D recording, a user's starting location relative to the object is ascertained by a computer vision module. Starting from the origin of a coordinate system as the starting location of the camera, one or more specified and/or settable relative positions in the vicinity of the object and/or in the object are determined as one or more locations for the respective perspective of the camera for taking at least one second 2D recording. The respective location in an object view on a display of the camera is displayed by a respective first augmented reality marker on the ground and/or on the object. The alignment of the camera with regard to angle and rotation with the perspective corresponding to the respective location is performed in this case by second augmented reality markers as auxiliary elements.

20 Claims, 6 Drawing Sheets

(51) Int. Cl.
*G06T 7/507* (2017.01)
*G06V 10/24* (2022.01)
*G06T 17/00* (2006.01)
*G06V 20/62* (2022.01)

(52) U.S. Cl.
CPC ............ *G06V 20/20* (2022.01); *G06V 20/625* (2022.01); *G06T 2207/30244* (2013.01); *G06T 2207/30252* (2013.01); *G06T 2207/30268* (2013.01)

(58) Field of Classification Search
CPC .. G06T 7/74; G06T 7/75; G06T 15/60; G06T 19/006; G06T 19/20; G06T 2207/30204; G06T 2207/30244; G06T 2207/30252; G06T 2207/302689; G06T 2219/2004; G06V 10/24; G06V 10/245; G06V 20/20; G06V 20/56; G06V 20/59; G06V 20/625; G06F 3/011; G06F 3/04815; H04N 5/23222; H04N 5/232939
See application file for complete search history.

(56) References Cited

U.S. PATENT DOCUMENTS

| | | | |
|---|---|---|---|
| 2015/0139535 A1 | 5/2015 | Siddiqui | ............... G06T 7/0028 |
| 2016/0034590 A1 | 2/2016 | Endras et al. | .... G06F 17/30867 |
| 2019/0098205 A1 | 3/2019 | Duffy | ................. H04N 5/23222 |
| 2019/0306411 A1* | 10/2019 | Lusk et al. | ....... H04N 5/232935 |
| 2019/0312985 A1 | 10/2019 | Yeap et al. | ......... H04N 1/00183 |

FOREIGN PATENT DOCUMENTS

| | | | |
|---|---|---|---|
| EP | 3 502 960 A1 | 6/2019 | ............... G06K 9/00 |
| WO | 2015/079231 A1 | 6/2015 | ............. H04N 5/232 |
| WO | PCT/EP2020/082611 | 11/2020 | |

OTHER PUBLICATIONS

Translation by WIPO dated Jul. 28, 2022 of International Preliminary Report on Patentability for International Appl. No. PCT/EP2020/082611.
Office Action dated Sep. 30, 2020 for German Application No. 10 2020 101 398.1.
"Spyglass und Commander Compass Benutzerhandbuch"; happymagenta.com/spyglass/guides/SpyglassUserGuide.de.pdf.
"Now & then: Image Overlay Camera", printed on Aug. 30, 2019 from apps.apple.com/gb/app/now-then-image-overlay-camera/id1032272181.
"Ajapaik rephoto", printed on Aug. 30, 2019 from play.google.com/store/apps/details?id=ee.ajapaik.android&hl=en_US.
"Project rePhoto", printed on Aug. 30, 2019 from projectrephoto.com/projectRephoto.
Office Action dated Sep. 13, 2022 for Chinese Application No. 202080071882.4, with English language summary of Examiner's comments.

* cited by examiner

METHOD FOR GENERATING REPRODUCIBLE PERSPECTIVES OF PHOTOGRAPHS OF AN OBJECT, AND MOBILE DEVICE WITH AN INTEGRATED CAMERA

CROSS REFERENCE TO RELATED APPLICATIONS

This application is a U.S. national stage of International Application No. PCT/EP2020/082611, filed on Nov. 19, 2020. The International Application claims the priority benefit of German Application No. 10 2020 101 398.1 filed on Jan. 22, 2020. Both the International Application and the German Application are incorporated by reference herein in their entirety.

BACKGROUND

Described herein are a method and a mobile device with an integrated camera for generating reproducible perspectives of photographs of an object.

A combined normal-light and infrared camera is known from EP 2 608 531 A2, which, based on a first normal-light recording of a view with the normal-light camera or another camera and the current image data of a further recording of the same view at a later point in time, provides information on how to find the first recording position of the view. When the first recording position is reached, a second recording is taken in order to create a before-and-after effect.

A method for generating an object image alignment packet is known from US 2015/0139535 A1. To generate the object image alignment packet, a 3D model of an object is first generated. In order to combine respective views of the 3D object with real images, a 2D photograph of the object is taken from predetermined directions. Sections are generated for the 3D model of the object according to the perspectives of the respective 2D recordings. The sections of the 3D model corresponding to the respective 2D recordings are then superposed and aligned according to the surface of the section. Finally, the article with the 2D image superposition is cut out. A disadvantage of the known method is that the perspectives of the respective 2D recording do not always match with the section of the 3D model, and distortions can arise when the 2D recording is aligned with the respective surface of the section.

SUMMARY

The method described herein produces reproducible photographs of an object in defined perspectives.

In this context, the term camera is understood to mean a camera integrated in a mobile device.

The method for producing reproducible photographs of an object in defined perspectives uses a first 2D recording of a specified reference view of an object captured by a camera. From the first 2D recording, a starting location is ascertained by a computer vision module. Starting from the starting location, one or more specified and/or settable relative positions in the vicinity of and at and/or in the object are determined as one or more locations to be adopted for the respective perspective of the camera for taking at least one second 2D recording. The respective location is displayed in an object view on a display of the camera by a respective first augmented reality marker on the ground and/or on the object. In other words, the method makes it possible to photograph an object from predetermined and identical perspectives in a respectively reproducible manner. For this purpose, a reference view of an object is initially captured with a camera. If the object is a motor vehicle, for example, a view of the front license plate of the motor vehicle can be specified as the reference view. A computer vision module uses an image processing method to recognize the outlines and specific patterns of the reference object and uses them to determine a starting location that can be positioned on the reference object. The respective locations for the respective 2D recordings are determined as relative positions from the starting location. A distance of the camera from the starting location is then calculated, starting from the starting location on the reference object, for example by triangulation during autofocus and/or comparison of size ratios of the reference object in the reference view. The user is then shown on the display of the camera the relative distance of the camera from the location of the first perspective by an augmented reality marker. An acceleration and gyro sensor system is used to ascertain and check how the camera should be aligned so that the respective perspectives for the photographs of the object at the respective locations are achieved. As a result, the user can recognize which location should be adopted in each case for the respective 2D recording of the object in the respective perspective. By displaying the locations by augmented reality markers, the user is provided with assistance so that they know the location from which they should take a respective 2D recording of the object so that the object is always reproducibly photographed from the same perspectives. The method has the advantage here that a consistent quality of the object presentation can be ensured independently of a person taking the photographs. Furthermore, the perspectives from which the object should be photographed can be adapted to the object by a user and/or by a prior setting.

The shapes and configurations of the augmented reality markers described here are to be understood as examples and can also encompass other shapes and configurations.

The method has additional advantages described below.

According to one embodiment, one or more auxiliary elements are displayed to the user at one or more locations by second augmented reality markers in the object view on the display of the camera for aligning the camera with the at least one specified and/or settable perspective. In other words, when the user arrives with the camera at a location from which a perspective of the object is correct and a photograph of the object is to be taken, the respective alignment and orientation of the camera must be aligned in accordance with the perspective. For this purpose, the user is given assistance by one or more auxiliary elements, which are displayed to the user on the display in the form of second augmented reality markers. For example, these augmented reality markers can present one or more circles, wherein one of the circles has a point in the center, analogously to a target. This gives the user the impression of aiming at the view-point that the camera should be pointing at for the respective perspective from the respective location.

In addition, at least one further circle with a continuous crossbar, which is to be placed in the center of the circle for adjusting the distance intended for the respective perspective, can be added as a further auxiliary element. By rotating the crossbar around its center point, the user can additionally be given feedback relating to the rotation of the camera. For example, when the horizontal alignment intended for the respective perspective is reached, the crossbar can be arranged horizontally in the center of the circle, for example, to indicate to the user that the rotation angle of the camera intended for the respective perspective has been reached.

The rotation angle can be ascertained by the camera's intrinsic gyro and acceleration sensors. The resulting advantage is that the user is given assistance as to how the camera should be aligned at the respective location of the respective perspective.

The shape of the auxiliary elements as second augmented reality markers cannot be limited to the shape of a circle with/without a center point and a crossbar.

According to one embodiment, the one or more auxiliary elements are arranged in line with one another when the at least one specified and/or settable perspective is achieved. The resulting advantage is that, in order to achieve the perspective mentioned above, the respective auxiliary elements are arranged in line with one another in such a way that the user is given the impression of aiming at the correct perspective. This is done, for example, by at least two circles, with one circle having a center point for presenting a target. Likewise, when the rotation intended for the respective perspective is achieved, a crossbar, for example, floating in line with the circles, can be added as a further auxiliary element. By bringing the crossbar into one of the circles by floating, for example, the user can be shown that the horizontal alignment intended for the respective perspective has been achieved. The user can likewise be given additional feedback relating to the rotation of the camera, for example by rotating the crossbar around its center point in one of the circles. When the auxiliary elements are arranged in a line with one another, the user is likewise given visual feedback that the camera has been correctly aligned in terms of recording the perspective.

The following describes how photographing an object, such as a motor vehicle, may proceed.

According to one embodiment, the camera uses the computer vision module to recognize a reference object on the object in the reference view and uses a contour or pattern of the reference object to ascertain the starting location relative to the object. In other words, the reference view can be any view of the object that includes a reference object, such as a specific feature. The specific feature can here be a contour or pattern that is recognizable by a computer vision method, for example the license plate of a motor vehicle. This specific feature serves as a reference object onto which the origin of a coordinate system of the camera is placed as the starting location for determining the positions to be adopted and the perspectives relative to the starting point. The reference object is recognized here in real time by artificial intelligence.

A distance of the camera from the reference object on the object is measured on the basis of the position of the reference object found in the coordinate system. The origin of the coordinate system for the camera is placed onto the reference object as the starting location, from which all other locations are calculated as a relative position with respect to the origin as the starting location. For example, if the object is a motor vehicle, the starting location can be placed in the center of the front license plate. The relative distance of the camera from the first location for the first perspective can be ascertained from the distance of the camera from the starting location that is now known. The resulting advantage is that the perspectives are dependent exclusively on the object. Since the respective locations for a respective object are determined as a relative position based on the respective starting location on the reference object of the object, consistent quality of the 2D recordings is ensured. Furthermore, the 2D recordings for different objects of the same type, for example different models of the same motor vehicle, are reproducible.

According to one embodiment, the camera uses at least one acceleration and/or gyro sensor to ascertain its current relative position and orientation relative to the starting location. In other words, as soon as the starting location has been determined via the computer vision module, the movement of the camera between the respective locations for the 2D recordings in the respective perspective is tracked using at least one acceleration and/or gyro sensor and triangulation. The resulting advantage is that when the location changes, no new reference recording from different sides of the object is necessary for calibrating the camera.

According to one embodiment, the object is a motor vehicle. The resulting advantage is that, in the case of a motor vehicle, the respective reference object, for example a license plate, can be clearly determined. Furthermore, different models of a motor vehicle can be photographed with consistent quality and in a reproducible manner. In addition, the method can also be extended to 2D recordings of the interior of the motor vehicle.

According to one embodiment, the reference object is the license plate of the motor vehicle. In other words, a license plate of the motor vehicle can be used as the reference object for determining the starting position of the camera. Since methods for automatic license plate recognition of motor vehicles already exist, there is the advantage that existing methods can be used therefor and a starting location can be determined with sufficient accuracy, from which all further locations for the respective perspectives relative to the motor vehicle can be calculated. As a result, the respective locations are placed for different motor vehicles with the same dimensions at the same coordinates, with the result that a consistent quality of the 2D recordings can be reproducibly ensured.

According to one embodiment, the dimensions of the object are taken into account when determining the one or more locations for the respective perspective of the camera. In other words, there is a difference between whether, for example, the motor vehicle is a large SUV or a small car. This results in relative shifts in the respective dimension. For example, the perspective that is aligned with a rear door of an SUV in side view is already outside the view of a small car, and the location for the perspective for the side view of the rear door for the small car therefore needs to be moved further forward. In such an extreme case, the perspectives of the 2D recordings can be adapted to the dimensions of the respective object. The resulting advantage is that the method can reproduce 2D recordings of the respective perspectives with consistent quality for one or more different objects.

According to one embodiment, a number or quantity of specified perspectives encompasses both perspectives in the vicinity of the object and perspectives in the interior of the object. In other words, an object can be photographed from locations around the object. In addition, if it is possible to physically enter the interior of an object, such as a motor vehicle with an interior, the interior of the object can also be photographed analogously from the perspectives intended therefor. For this purpose, the respective locations in the interior are likewise displayed to the user based on the starting location. In addition, for a transition from a location in the vicinity of the motor vehicle to a location in the interior of the motor vehicle, the user can be shown a message, for example to open a door and/or to move to a specific seat, such as the middle seat in the vehicle's rear. The resulting advantage is that the method is not limited solely to an external view of the object.

According to one embodiment, automatically cut out images and/or compositions of the object can be generated using a 3D model of the object in the outside region of the object by overlaying a mask. In other words, by using 3D models of the vehicle, a mask can be generated by overlay in the outside region, and automatically cut-out images or compositions, for example with a shadow or another background, can be generated. The superimposition of the 2D recordings of a motor vehicle with the corresponding 3D model of the motor vehicle takes place in the case of the 2D recording of the reference view with the reference object. Starting from the reference view, the 3D model has corresponding silhouettes according to the respective perspective. A mask can be generated by overlaying the respective 2D recording from one perspective with the respective 3D model silhouette. This means that the motor vehicle can be cut out from the background.

With the cut-out image or composing, shadows can likewise be generated according to the perspective and simulated incidence of light. The resulting advantage is that the motor vehicle can accordingly be photographed independently of the background. The generation of compositions, for example with shadows or another background or the like, offers the advantage that a consistent quality can be produced independently of the location of the photograph of the motor vehicle. Furthermore, it produces the advantage that the images can be prepared accordingly ready for sale by an overlay, for example of the license plate.

According to one embodiment, the 3D model is selected by the user. This offers the advantage that the 3D model fits the object to be photographed. For example, this can be a specific model of a motor vehicle. For example, if the user wants to photograph a specific motor vehicle model for a sale, the corresponding model type is preselected in a menu so that the 3D model can be retrieved from a memory of the camera and/or a server unit. The 3D model furthermore contains the dimensions of the corresponding motor vehicle model. The resulting advantage is that the method is applicable to different objects in a reproducible manner with consistent quality.

According to one embodiment, a shadow can be calculated using the 3D model and can be inserted into the at least one 2D recording. In other words, the object is recognized in a 2D recording and superimposed with a 3D model corresponding to the object. The 3D model is superposed in the corresponding silhouette from the perspective of the 2D recording. By superimposing the respective 2D recording with the respective silhouette of the 3D model of the object, the 2D recording can be cut out from the background. Additionally or alternatively, the 3D model can be used to simulate and generate a shadow in relation to a virtual light source. This shadow can then be inserted into the 2D recording. The resulting advantage is that the photograph can be taken reproducibly from the desired perspective, independently of the actual light conditions.

According to one embodiment, the second 2D recording of the object can be modified by overlays or cutouts. In other words, the object can be cut out from the background by using the 3D model and the overlay the respective 3D model of the object on the object recognized in the 2D recording. In addition, specific features of the object, such as the license plate of a motor vehicle, can be overlaid. The resulting advantage is that the 2D recordings are automatically anonymized and that data protection aspects can thus also be implemented automatically. This also has the advantage that the object is cut out from the background and can therefore be photographed independently of the background. Furthermore, this results in the advantage that 2D recordings can be made independently of the background with consistent quality regardless of the photography location.

According to one embodiment, the method is implemented by a mobile device with an integrated camera. The resulting advantage is that the method can be implemented by a smartphone with an appropriately equipped camera. Furthermore, the data link can be realized using a network connection of the smartphone. Furthermore, this results in the advantage that the corresponding acceleration and gyro sensor system of the mobile device can be used for location determination relative to the object.

BRIEF DESCRIPTION OF THE DRAWINGS

These and other aspects and advantages will become more apparent and more readily appreciated from the following description of the exemplary embodiments, taken in conjunction with the accompanying drawings of which.

These and other aspects and advantages will become more apparent and more readily appreciated from the following description of the exemplary embodiments, taken in conjunction with the accompanying drawings of which.

DETAILED DESCRIPTION

In the exemplary embodiment, the described components of the embodiments each constitute individual features that should be considered independently of one another and that in each case also develop the invention independently of one another and should therefore also be considered individually or in a combination other than the one shown. Furthermore, the embodiment described may also be supplemented by further ones of the features already described.

In the figures, the same reference signs denote elements having the same function.

Figure 1:
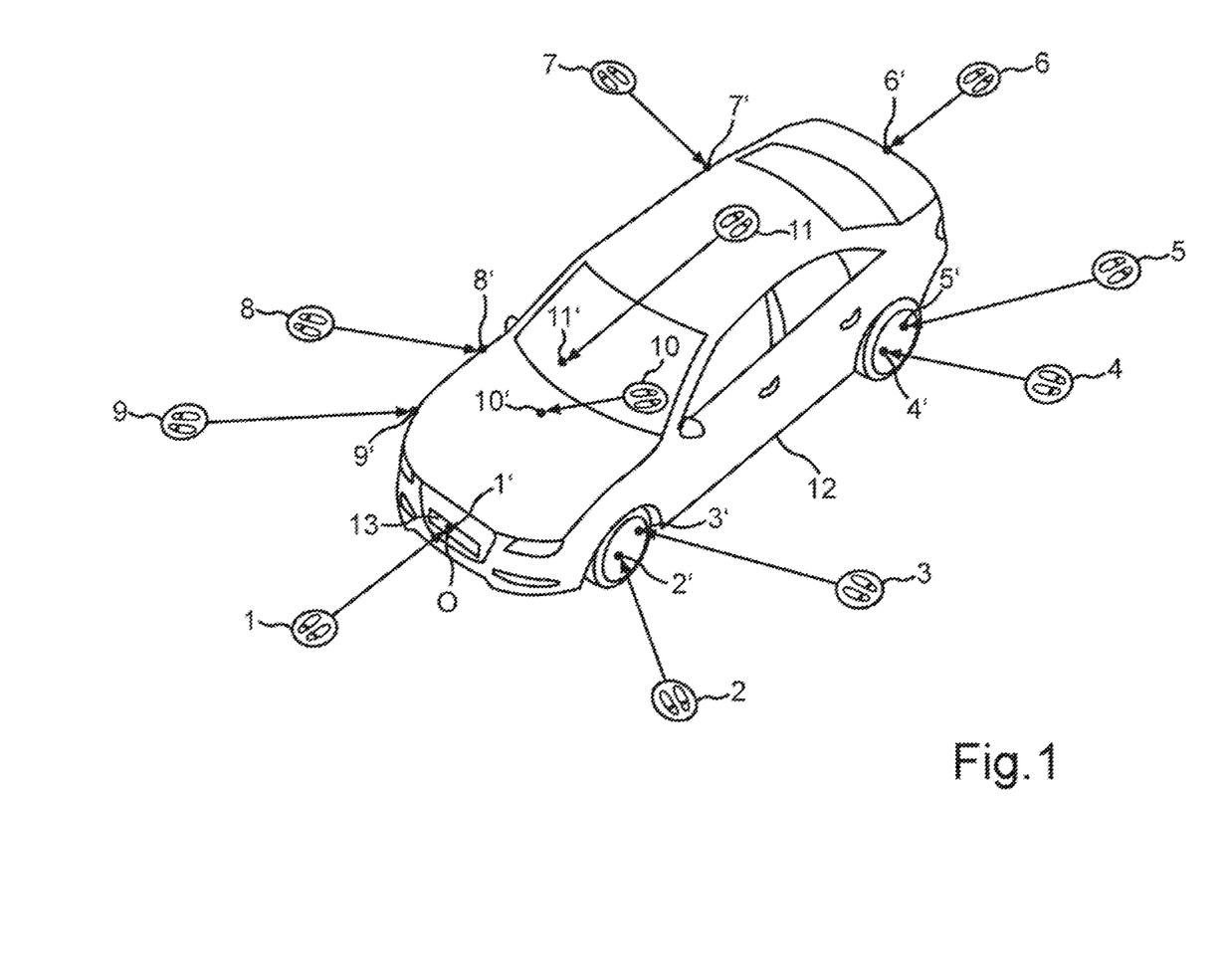
FIG. 1 is a schematic perspective view of an object to be photographed in the form of a motor vehicle, as well as standpoints, wherein a perspective of a 2D recording from which the object should be photographed is assigned to the respective standpoint.

FIG. 1 shows an object to be photographed as the motor vehicle 12. The example can be based on the following exemplary situation: Starting from a reference view with a reference object which can be, for example, the center of the front license plate 13 of the motor vehicle 12, an origin O of the coordinate system of the camera is determined as the starting location. All locations 1 to 11' with their respective perspectives 1' to 11' are determined relative to the origin O. The perspectives can be defined here in such a way that the user at the respective location 1 to 11 points the lens of the camera at a point on the object provided for the respective perspective 1' to 11' at a specific angle of inclination. This can be ascertained by an acceleration and gyro sensor system in the camera. For example, in the beginning, the user photographs the front of the motor vehicle 12 with the license plate 13 as the reference object using an instruction displayed on the display of the camera. Based on automated image recognition by a computer vision module, a reference view of the motor vehicle 12 in the form of the license plate 13 is recognized. The camera now defines for example the center of the license plate 13 as the origin O of its coordinate system as the starting location for location determination.

Furthermore, the computer vision module can be used to ascertain the distance at which the camera is located from the origin O on the license plate 13. This can be ascertained using the size ratios in the 2D recording. Then, the relative position of the camera's current location and of the location 1 is determined and is displayed to the user by an augmented reality marker shown on the ground. FIG. 1 shows the locations 1 to 11 around the motor vehicle 12 with their respective perspective views, which are presented as points at which the lens of the camera should point. The points 1' to 11' at which the lens of the camera should be pointed from the respective location 1 to 11 are referred to below as the perspectives 1' to 11'. A distinction is made here between the locations 1 to 9 in the outside region of the motor vehicle 12 and the locations 10 to 11 in the interior of the motor vehicle.

After the 2D recording of the reference view with the location determination, the user is prompted to move to the location 1 and to align the camera with the first perspective 1'. The first augmented reality markers can be circles with enclosed footprints, for example. These show the user how to position themselves at the respective location 1 to 11, so that they are automatically already looking at the respective perspective for the location. To align the camera at the respective location 1 to 11 with the respective perspective 1' to 11', auxiliary elements are used, which are in line with one another when the perspective 1' to 11' is achieved. Thus, when aligning the camera with the perspective 1' if the user is at the location 1, the user has the impression that they are aiming at the point 1' to achieve the perspective 1'. The recording of the 2D recording when the perspective 1' is achieved can take place here automatically as soon as the corresponding auxiliary elements are arranged in line with one another.

When the 2D recording for the perspective 1' at the location 1 has been made, the location 2 can be displayed to the user on the display of the camera by the first augmented reality marker. For example, this can already take place in the form of a circle with graphic or written content that displays two footprints when the location is reached in order to indicate to the user how they are to position themselves at the location 2 for the perspective 2'. This display of the location 2 is associated with the message that the user should move to the location 2. Once the user has arrived at the location 2, they have to align the camera according to the perspective 2'. This is accomplished by displaying at least one auxiliary element. As soon as the camera is aligned with the perspective 2', the auxiliary elements are arranged in line with one another for this purpose and the second 2D recording is taken at the perspective 2' from the location 1. This process is repeated for the locations 3 to 9 in the outside region of the motor vehicle 12, wherein the locations 1 to 9 are each displayed with the first augmented reality markers on the ground 18 in the vicinity of the motor vehicle 12.

As soon as the location 10, which is on the driver's seat of the motor vehicle 12, has been reached, the user can be shown, for example by a text message on the display of the camera, to first open the driver's door of the motor vehicle 12 and to move into the interior of the motor vehicle 12 to the specific point 10. Then follows the instruction to go to the location 10 and to align the camera with the perspective 10', analogous to the perspectives in the outside region. The locations 10 to 11 are each displayed here with the first augmented reality markers on the seat surfaces intended therefor and/or on the motor vehicle's floor.

The respective starting locations are prescribed here in accordance with the dimensions of the motor vehicle 12. For example, it can make a difference whether the motor vehicle 12 is a large the motor vehicle or a small car in the perspective at the location 5 from diagonally behind. In an extreme case, this may mean that if the user photographs a small car while using the dimensions of a large SUV, the user may possibly photograph past the motor vehicle. Therefore, the dimensions of the object can be taken into account when determining the location. This is done by prior selection of the respective motor vehicle model, which includes the appropriate dimensions. On the basis of the corresponding dimensions, the previously determined locations are now calculated by the camera, starting from the origin O as the starting location, and are displayed to the user on the ground 18 on a display by the first augmented reality markers.

Figure 2:
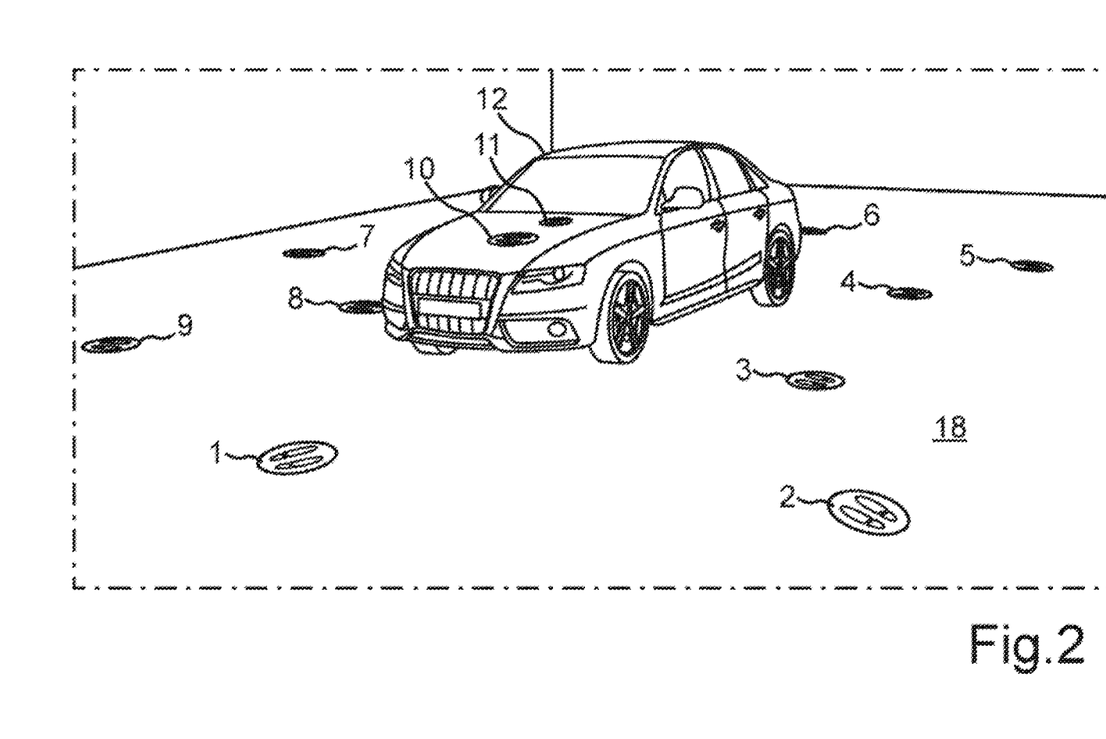
FIG. 2 is a perspective view of the object with the corresponding augmented reality markers for the location marking on a display screen of a camera.

FIG. 2 shows an exemplary possible presentation of the locations 1 to 11 on a camera display screen in relation to the motor vehicle 12. The locations 1 to 11 are marked here by a first augmented reality marker, which already contains footprints to present the viewing direction. The user then only has to align the camera according to the correct rotation and the yaw angle. This, for example, constitutes an initial support for the user when positioning the camera in order to achieve the desired perspective that corresponds to the respective location. The target point of the perspective is here displayed to the user by second augmented reality markers as auxiliary elements on the camera display. The method is designed in such a way that the user first photographs the front of the motor vehicle with the license plate 13. What is important in the method is the license plate recognition of the license plate 13 of the motor vehicle 12. This can be done, for example, from the front of the motor vehicle 12 or from behind.

Once a first starting location has been defined, the remaining locations 2 to 11 can be determined according to their positions relative to the starting location 11 with reference to the origin O as the starting location, placed on the license plate 13. As soon as the origin O has been defined on the license plate 13, the change in location can be determined as the starting location using the acceleration and gyro sensor system of the camera, for example that of a smartphone. This also allows the camera to recognize when the user has reached the corresponding location 1 to 11. In addition, the corresponding camera and gyro sensor system is used in order to achieve the intended perspective 1' to 11' at the respective location, so that the alignment of the camera with the respective perspective 1' to 11' remains the same.

Figure 3:
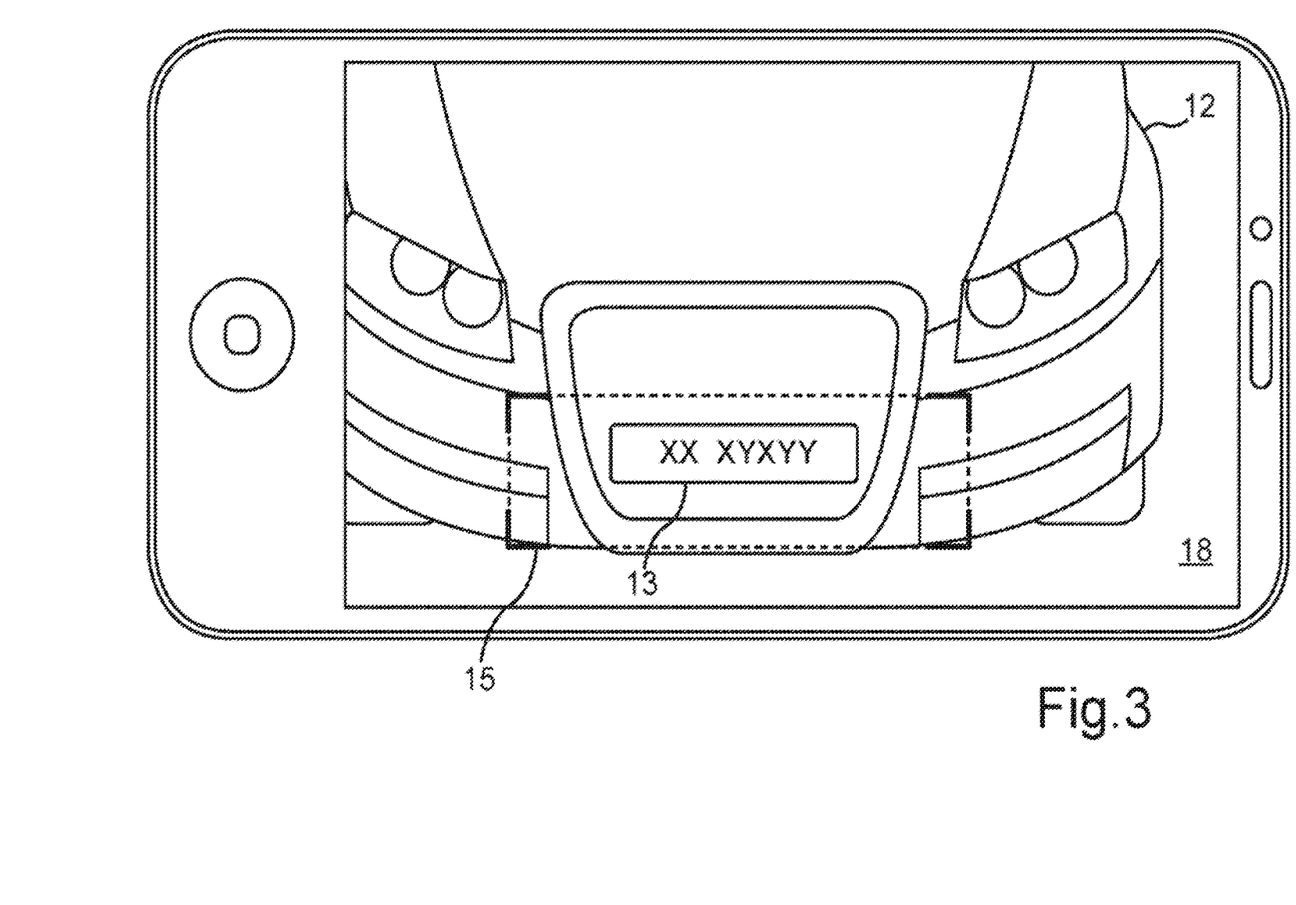
FIG. 3 is a first reference view of the object for location determination and calibration.

FIG. 3 shows an example of a reference view related to the motor vehicle 12 for determining the origin O as the starting location. To determine the origin O, a reference object on the object 12 is recognized. Here, for example, this is the license plate 13. Using existing methods of image recognition, the license plate 13 can be recognized and the distance of the camera from the license plate 13 can be determined using the data from the autofocus of the camera and/or the stored dimensions of the license plate 13 in comparison with the contour stored for the license plate 13. First, the user is shown, for example in the form of a text instruction 14, where they should go for the 2D recording of the first reference recording. This is, for example, the message that the user should stand in front of the motor vehicle 12 and record the license plate 13 within the frame 15.

The frame 15 here represents a region to be examined on the object 12. Using the recognized license plate within the frame 15 and the license plate 13 on the motor vehicle 12, a distance is determined using the stored dimension of the license plate 13. This can be done, for example, using the known and stored dimensions of the license plate 13 and a triangulation method as part of the autofocus of the camera. A first distance of the camera from the license plate 13 of the motor vehicle is ascertained from this method.

The origin O of a camera coordinate system used is then placed at the center of the license plate 13. The locations 1 to 11 with their respective perspectives 1' to 11' relative to the origin O as the starting location at the center of the license plate 13 are now ascertained analogously to FIG. 1, and the difference in the relative position of the camera with respect to the origin O and the relative position of the locations 1 to 11' are displayed to the user on the display of the camera by first augmented reality markers on the ground 18. This is the case, for example, because, in contrast to the text instruction 14, the user is less than one meter away from the license plate of the motor vehicle 12 or may be farther away. This is difficult to estimate, with the result that it is necessary to identify the distance of the camera from the license plate 13 in order to determine the relative position of the camera to the origin O and to the locations 1 to 11. This enables 2D recordings to be made with consistent quality from the respectively same perspective 1' to 11'. The first augmented reality markers for determining the locations 1 to 11 are displayed to the user in each case on the ground 18.

Figure 4:
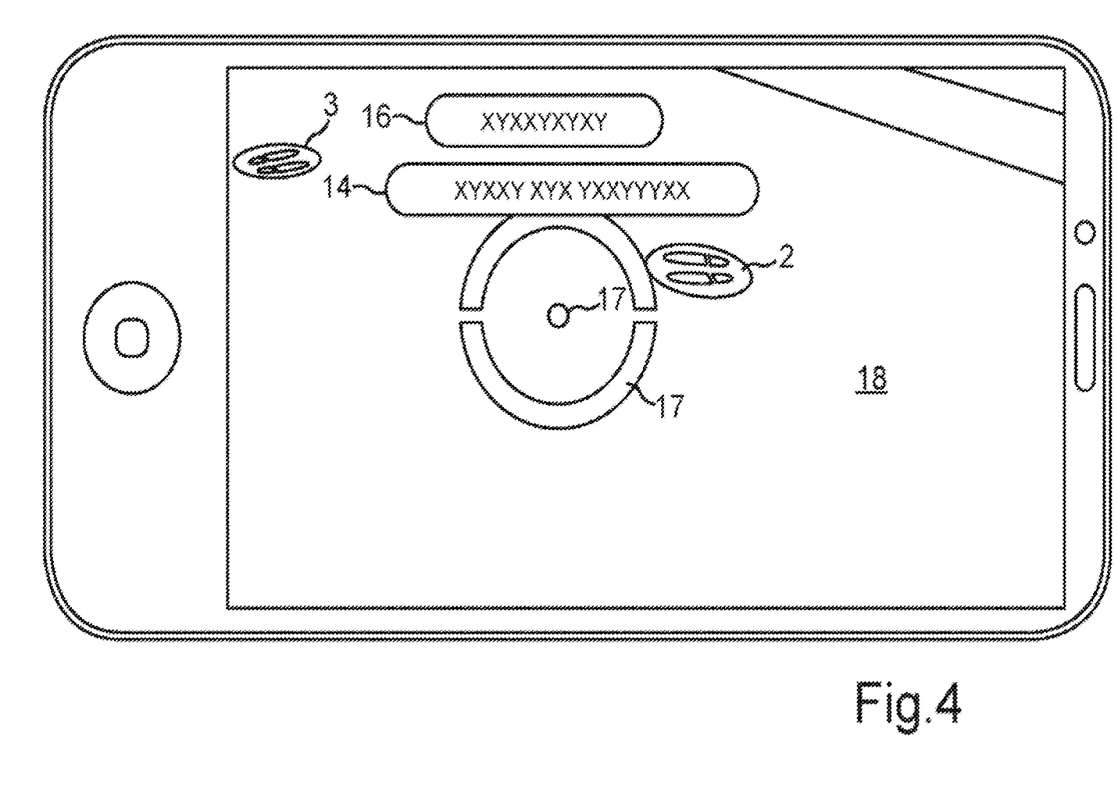
FIG. 4 is a view of augmented reality markers for location determination through a camera for orientation.

FIG. 4 shows the display of two different second augmented reality markers as auxiliary elements for aligning the camera with the respective perspective 1' to 11'. For a 2D recording from the perspective 2' intended herefor, for example, at the location 2, the first augmented reality marker is used to show the user that they should go to the location 2. In this case, the first augmented reality marker can be a circle that contains footprints that specify the standing direction for the user, so that their upper body faces the direction of the perspective 2'. This can be indicated, for example, by a red circle with white embossed footprints. Furthermore, for example the next location 3 can be displayed by a first augmented reality marker in the form of a transparent circle. The transparent circle at the location 3 can also contain other elements, such as a brand logo.

To align the camera with the respective perspective 2' at the location 2, the second augmented reality marker can be displayed as an auxiliary element in the form of a circle with a center point 17. A text message 16, for example, is shown to the user so that the user can identify which perspective recording is currently being taken. The text message 16 can include information such as: "Photo 2 of 12." The message to go to the next location 1 to 11 is also shown to the user on the display in the form of a text instruction 14. The text instruction 14 can be an instruction such as: "Go to the front driver side position." As soon as the user has reached the location 2, a further circle, in addition to the circle with the center point 17, is displayed for the correct alignment of the camera with the perspective 2'.

Figure 5:
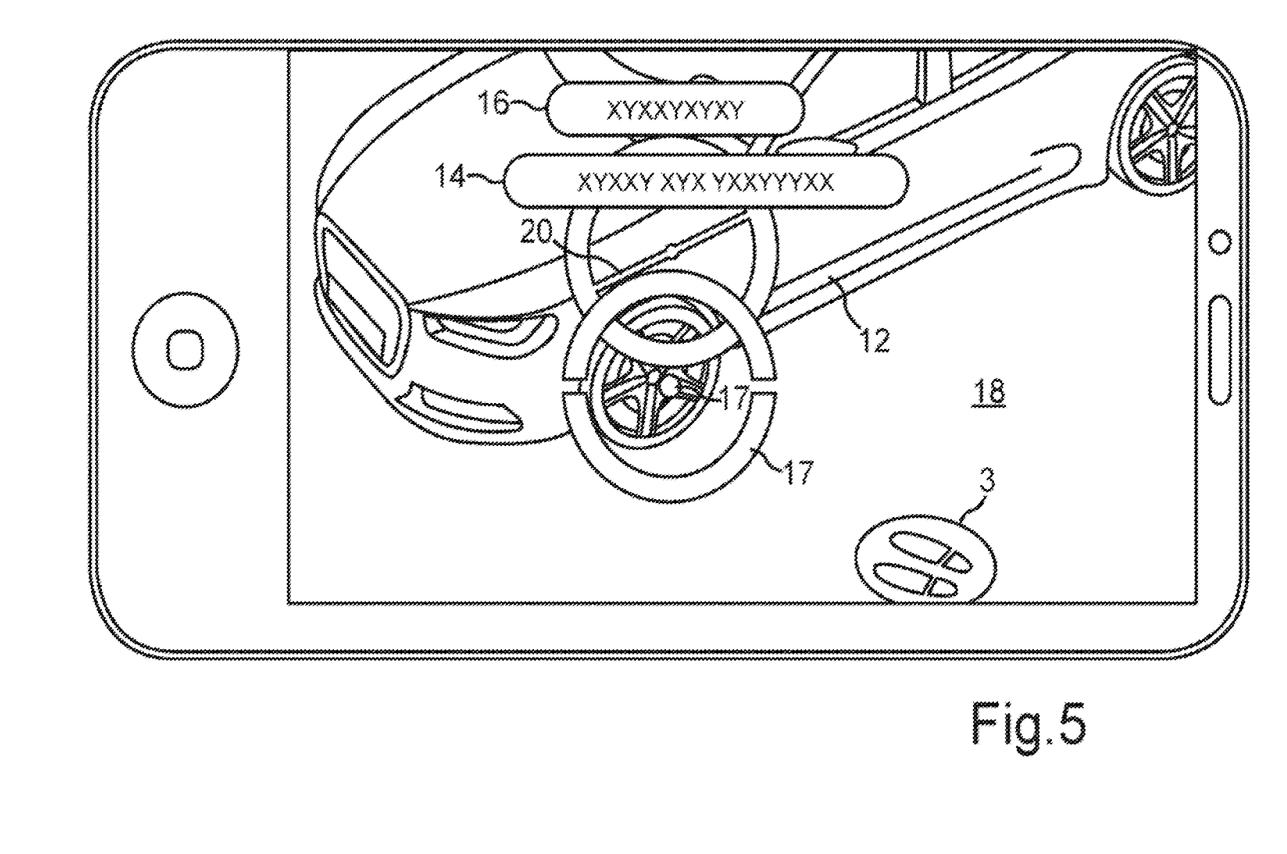
FIG. 5 is a view of corresponding second augmented reality markers through a camera as auxiliary elements for aligning the camera.

FIG. 5 shows, as the second augmented reality markers as auxiliary elements, the circle with the center point 17 and the circle 19 for the correct alignment of the camera with the perspective 2' at the location 2. For example, the display on the camera is shown, starting from the location 2, analogously to FIG. 1, wherein the lens of the camera is aligned with the perspective 2'. The perspective 2' can in this case be a virtual point in space which is invisible to the user. The user is assisted by the circles 17 and 19 in terms of how the camera is to be aligned in order to aim at the perspective 2'. This is accomplished by a circle with a center point 17 and the second circle 19 with a crossbar 20. The circles 17 and 19 are arranged in line with one another when the lens of the camera is aimed at the target point of the perspective 2', which is covered by the center point of the circle 17. The crossbar 20 indicates here a distance intended for the perspective 2'. This can be indicated, for example, by the crossbar 20 in that, for example, the crossbar 20 floats into the circle 19 from the outside and arranges itself in the center of the circle 19 when the distance intended for the perspective 2' has been reached. Furthermore, the angle of rotation of the camera intended for the perspective 2' can be indicated by the crossbar 20, for example by arranging the crossbar 20 horizontally at the center of the circle 19.

The text instruction 14 can be an instruction such as: "Go to the front driver side position." In the text message 16, information such as: "Photo 2 of 12" may be displayed. In this case, the next location is already displayed to the user on the ground 18. 2D recording of the 2D recording takes place as soon as the circles 17 and 19 are in line with one another. This can be realized either manually or in automated fashion. Afterwards, for example, the user can check the 2D recording and, if necessary, take a second 2D recording from the same perspective 2'. As soon as the 2D recording has been taken successfully, the next location 3 for the next perspective 3' is displayed to the user in the form of a transparent circle as a first augmented reality marker. The procedure described above is continued analogously until the perspective 11' at the location 11 has been reached. The text instructions 14 can be used to provide the user with location information or further actions, such as opening a motor vehicle door or sitting down in the middle seat in the back of a motor vehicle. The text message 16 can be used to display information about the current number of 2D recordings in comparison with a desired value of 2D recordings.

Figure 6:
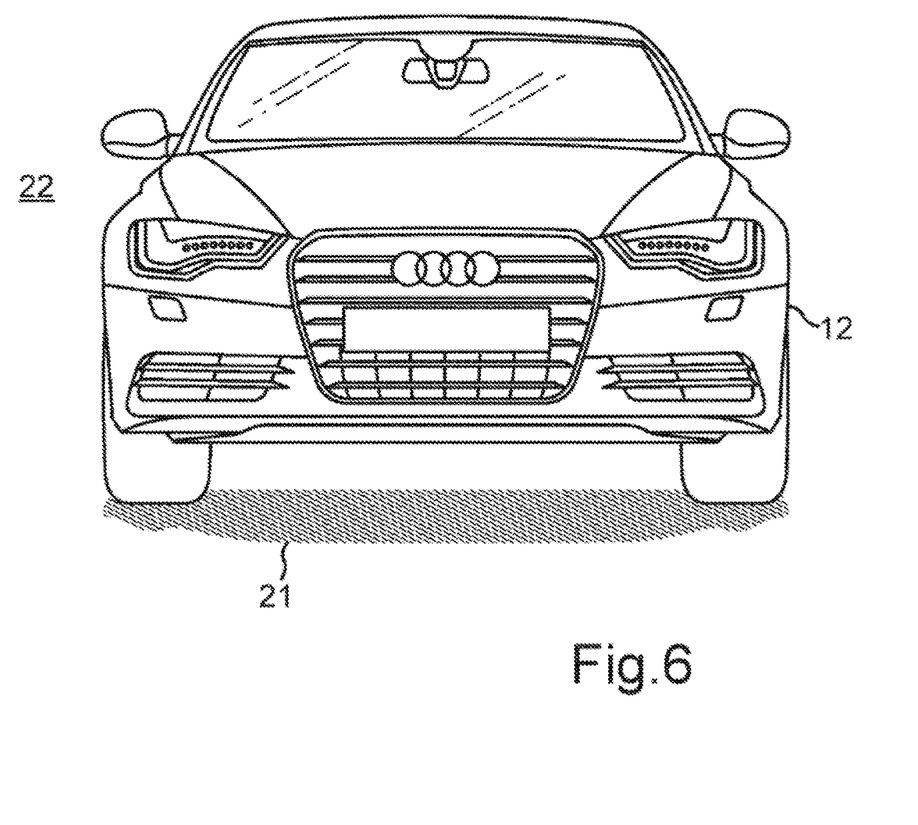
FIG. 6 is a cutout view of the photographed object corresponding to such an illustration with respect to a neutral background and a simulated shadow.

FIG. 6 shows a view of the motor vehicle 12 cut out from the background 22 to create 2D recordings independently of the background 22. A corresponding 3D model is retrieved here from a memory, which can either be a memory of the camera or a memory of a server unit. The corresponding silhouettes of the 3D model of the motor vehicle 12 are now superposed on the corresponding perspective recordings 1' to 11', and the motor vehicle 12 can now be cut out from the background 22. In addition, a shadow 21 corresponding to a virtual light source can be simulated. The background 22 can either have a neutral design, as a white background, or be any other background 22.

The method provides the user with a standard process for photographically imaging motor vehicles at a dealer or an end customer. Any photos of the respective the motor vehicle can be taken with consistent quality.

Overall, the current status shows that no standard process is used for the photographic imaging of motor vehicles at the dealer or end customer. The users take any photos and process them later, if necessary. The basic idea of the method is to guide the user to specified positions using markers. Disadvantages of the current prior art are that the images do not achieve the quality the customer expects. Furthermore, the variance in image quality is great, and post-processing may be carried out by third parties. Advantageous perspectives cannot be used in a targeted manner. The method within an app in the form of a mobile application ensures that photos with defined perspectives are also created in a vehicle-specific manner with consistent quality and reproducibly. Furthermore, there is the possibility of overlays, for example for license plates, or cut-outs, for example by removing the background. An advantage of the method is that the photos are taken with consistent quality regardless of the photographer. This is realized by guiding the user to the specified position using markers. One effect of the method is that it makes the photos reproducible. Furthermore, the photos can also be designed to be individualized for the object, since the locations can be programmed in each case specifically for the sales object.

Technically, the method is implemented using a camera of a mobile device. After capturing the vehicle using a camera of a mobile device, the real scene is enriched with 3D elements by augmented reality. Standpoints and auxiliary elements for the desired perspective are now visible around the vehicle. When all the elements have been brought in line with one another, a photo is automatically taken. This makes it possible to check the images to be recorded. Furthermore, this can be repeated as often as desired for different vehicles. By using 3D models of the vehicle, a mask can be generated by overlay in the outside region, and automatically cut-out images or compositions, for example with shadows or another background or the like, can be generated.

The method begins with the license plate of the motor vehicle being recognized for the position determination from the front or from behind. A 3D object of the motor vehicle is then positioned analogously to the recorded motor vehicle. The superimposition of the recorded motor vehicle with the respective 3D model of the motor vehicle takes place at image post-processing. Based on the recognition of the license plate, an AR marker is displayed on the ground to show the specified position. Next, additional markers for aligning the camera are displayed to the user. Then, the camera is automatically triggered when the specified perspective is achieved. This is accomplished, for example, when the auxiliary elements are arranged in line with one another as additional markers for aligning the camera. Next, the marker for the next location is displayed to the user after the recording of the photo has been successfully triggered. Then, the respective 2D recording is superimposed with the 3D object analogously to the perspective of the 2D recording in the silhouette corresponding to the 3D object and the 3D object is cut out from the background of the 2D recording. A shadow can be added later by the 3D object and a virtual light source.

This has the advantage that the photos can in each case still be configured by the user. In addition, specific markers on the object, such as license plates, can be automatically overlaid. Furthermore, the method also makes it possible to record interior images of the motor vehicle.

An embodiment relates to generating reproducible perspectives 1' to 11' of photographs of an object 12. In doing so, a first 2D recording of a specified reference view of the object 12 is captured by a camera and, starting from the first 2D recording, a user's starting location 1 relative to the object is ascertained by a computer vision module. Starting from the starting location as the origin O of the coordinate system of the camera, one or more specified and/or settable relative positions in the vicinity of the object 12 and/or in the object 12 are determined as one or more locations 1 to 11 for the respective perspective 1' to 11' of the camera for taking at least one second 2D recording. The respective location 1 to 11 in an object view on a display of the camera is displayed by a respective first augmented reality marker on the ground and/or on the object. The alignment of the camera with regard to angle and rotation with the perspective 1' to 11' corresponding to the respective location 1 to 11 is performed in this case by second augmented reality markers as auxiliary elements.

Overall, the example shows how the method allows users to be guided with markers to specified positions in order to produce photographic images of objects with consistent quality.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. A method for generating reproducible perspectives of photographs of an object, comprising:

capturing a first 2D recording of a specified reference view of the object by a camera;

ascertaining a starting location from the first 2D recording by a computer vision module;

determining, by starting from the starting location, at least one position, specified and/or settable relative to the object for a respective perspective of the camera for at least one second 2D recording of the object;

displaying a respective location on a display of the camera by a first augmented reality marker on at least one of ground and the object; and displaying, when a user is positioned at the respective location, at least one of at least one auxiliary element of at least one second augmented reality marker on the display of the camera for aligning the camera with at least one of the reproducible perspectives, the at least one auxiliary element indicating when the at least one of the reproducible perspectives is achieved, and at least one of cut-out images and compositions generated from the object by a 3D model of the object on an exterior of the object by overlaying a mask, including calculating a shadow from the 3D model that is inserted into the at least one second 2D recording.

2. The method as claimed in claim 1, wherein the computer vision module recognizes a reference object on the object in the reference view and from a contour of the reference object ascertains the starting location relative to the object.

3. The method as claimed in claim 2, wherein at least one of an acceleration sensor and a gyro sensor in the camera ascertains a current relative position and orientation relative to the starting location.

4. The method as claimed in claim 3, wherein the object is a motor vehicle.

5. The method as claimed in claim 4, wherein the reference object is a license plate of the motor vehicle.

6. The method as claimed in claim 5, wherein dimensions of the object are taken into account when determining the at least one position for the respective perspective of the camera, whereby the method is applicable to different objects.

7. The method as claimed in claim 6, further comprising, when the camera reaches the respective perspective, automatically capturing the at least one second 2D recording by the camera.

8. The method as claimed in claim 7, wherein the reproducible perspectives include exterior perspectives of the object and interior perspectives of the object.

9. The method as claimed in claim 8, further comprising: receiving a user selection pertaining to the 3D model; and retrieving the 3D model from at least one of a local memory and a server according to the user selection.

10. The method as claimed in claim 9, wherein the at least one second 2D recording of the object is modified by at least one of overlays and cut-outs.

11. The method as claimed in claim 2, wherein the reference object is a license plate of the motor vehicle.

12. The method as claimed in claim 1, wherein the object is a motor vehicle.

13. The method as claimed in claim 1, wherein dimensions of the object are taken into account when determining the at least one position for the respective perspective of the camera, whereby the method is applicable to different objects.

14. The method as claimed in claim 1, further comprising, when the camera reaches the respective perspective, automatically capturing the at least one second 2D recording by the camera.

15. The method as claimed in claim 1, wherein the reproducible perspectives include exterior perspectives of the object and interior perspectives of the object.

16. The method as claimed in claim 1, further comprising: receiving a user selection pertaining to the 3D model; and retrieving the 3D model from at least one of a local memory and a server according to the user selection.

17. The method as claimed in claim 1, wherein the at least one second 2D recording of the object is modified by at least one of overlays and cut-outs.

18. A camera, comprising:
a display; and
a processor, configured to
  capture a first 2D recording of a specified reference view of an object;
  ascertain a starting location from the first 2D recording by a computer vision module;
  determine, by starting from the starting location, at least one position, specified and/or settable relative to the object for a respective perspective of the camera for at least one second 2D recording of the object;
  display a respective location on a display of the camera by a first augmented reality marker on at least one of ground and the object; and
  display, when a user is positioned at the respective location, at least one of
    at least one auxiliary element of at least one second augmented reality marker on the display of the camera for aligning the camera with at least one of the reproducible perspectives, the at least one auxiliary element indicating when the at least one of the reproducible perspectives is achieved, and
    at least one of cut-out images and compositions generated from the object by a 3D model of the object on an exterior of the object by overlaying a mask, including calculating a shadow from the 3D model that is inserted into the at least one second 2D recording.

19. The camera as claimed in claim 18, wherein the computer vision module recognizes a reference object on the object in the reference view and from a contour of the reference object ascertains the starting location relative to the object.

20. The camera as claimed in claim 18, wherein the reproducible perspectives include exterior perspectives of the object and interior perspectives of the object.

* * * * *